UNITED STATES PATENT OFFICE.

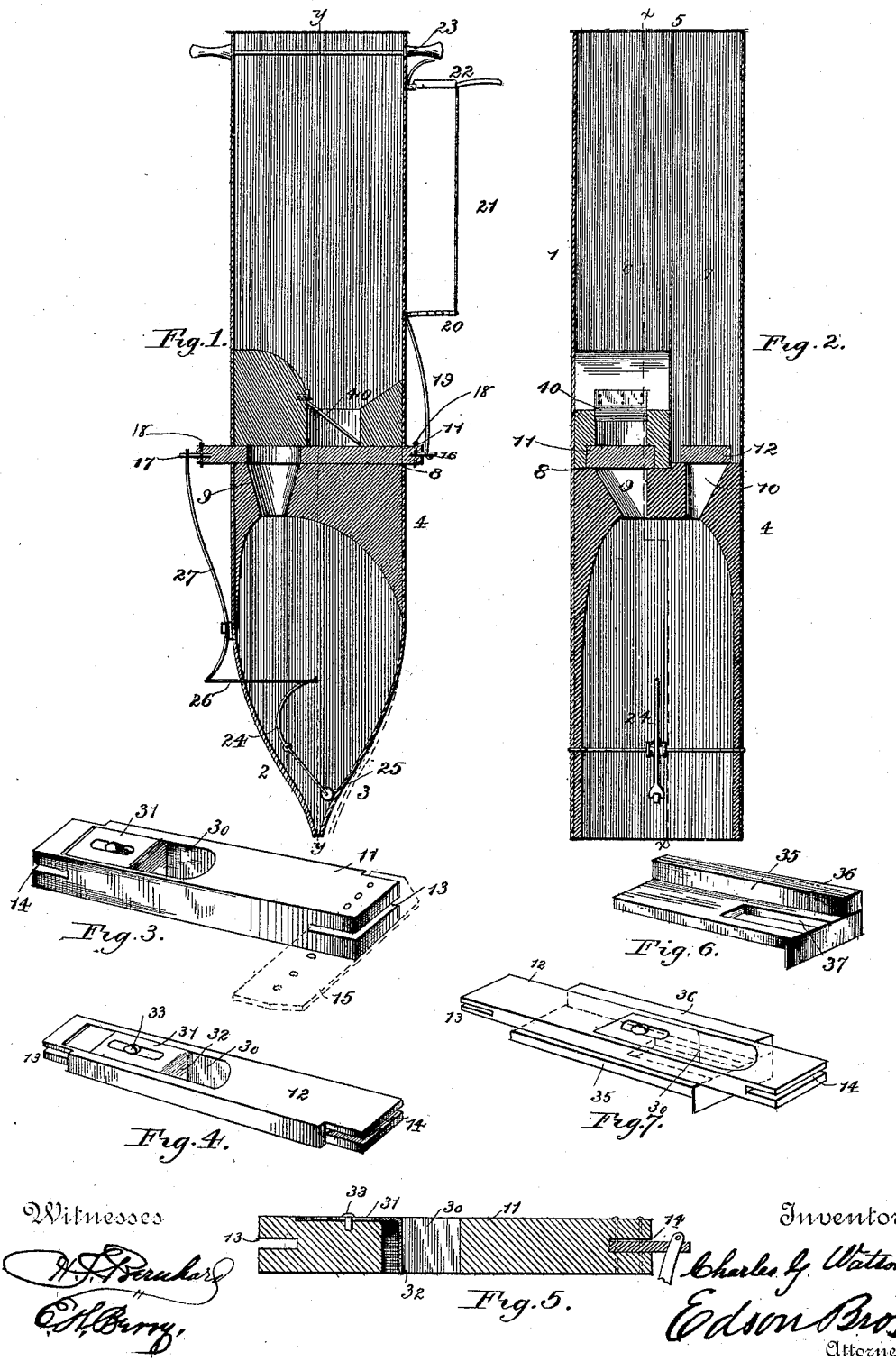

CHARLES G. WATSON, OF PINEY GROVE, MARYLAND.

HAND-PLANTER.

SPECIFICATION forming part of Letters Patent No. 405,633, dated June 18, 1889.

Application filed March 14, 1889. Serial No. 303,296. (No model.)

*To all whom it may concern:*

Be it known that I, CHARLES G. WATSON, a citizen of the United States, residing at Piney Grove, in the county of Alleghany and State of Maryland, have invented certain new and useful Improvements in Hand-Planters; and I do hereby declare the following to be a full, clear, and exact description of the invention, such as will enable others skilled in the art to which it appertains to make and use the same.

This invention relates to improvements in hand corn-planters; and it has for its object, primarily, to provide for the automatic planting of a uniform quantity of corn or other seeds and fertilizer or phosphate in the ground or a hill, to adapt the implement for planting two different kinds of seed in the same hill in lieu of one kind of seed and a phosphate, and, finally, to improve the parts in minor details with a view to promoting simplicity and durability of construction and efficiency and certainty of operation.

With these ends in view I provide a hand corn-planter with two isolated longitudinal compartments, which are closed at their lower ends by a common bottom through which are formed two separate independent passages or openings that lead from the isolated apartments and open through the lower side of the fixed bottom at points in close juxtaposition to each other, so that the corn and fertilizer are deposited in the lower part of the shell or case close together and commingled. Transversely through this bottom and intersecting the independent passages or openings therein is formed a horizontal passage or way in which reciprocates two slides— one for each compartment of the shell or case—and each of these slides has a transverse vertical opening, which is adapted at suitable intervals to alternately coincide with the passages in the bottom and to be thrown out of coincidence therewith, so as to permit the proper quantity of corn and fertilizer to pass from the compartments through the slide and into the lower part of the case or shell. These slides are connected together and operated by a common hand-lever, which is fulcrumed on the shell or case near the upper end thereof, and to the opposite end of these slides is connected a depending lever, which in turn is connected by an intermediate link with another bell-crank lever that is arranged within the lower part of the inclosing shell or case, and carries at its free end a friction-roller that bears or rides against a laterally-movable spring side or wall at the lower extremity of the shell or case. The sides or walls at the lower extremity of the shell or case of the planter converge and meet each other in the plane of the vertical center or axis of the shell, so that the lower end of the implement can be inserted with facility and ease into the ground or hill to plant the seed therein, and one of these walls is rigid while the other is made of spring or elastic metal, is capable of movement laterally of the rigid wall when the bell-crank lever is turned by the outward movement of the reciprocating slide, and has sufficient resiliency or strength to automatically close itself and force the slides into their normal positions to receive a new charge of seed and fertilizer from the compartments when the pressure is removed from the hand-lever. Each slide is provided with an adjustable plate for varying the size or area of the slot therein, and to adapt the implement for planting a different kind of seed from the corn and in lieu of the phosphate or fertilizer, so that two kinds of seed can be simultaneously planted at one thrust of the implement into a hill, I have adapted the slide ordinarily used for the fertilizer-apartment to be used in connection or interchangeably with another slide having a receiving-opening of smaller area or size.

To enable others to understand my invention, I will now proceed to describe the same in connection with the accompanying drawings, in which—

Figure 1 is a vertical central sectional view on the line *x x* of Fig. 2. Fig. 2 is a corresponding sectional view taken on a plane at right angles to that on which Fig. 1 is taken and on the line *y y* of Fig. 1. Fig. 3 is a detail perspective view of one of the slides that is adapted for use in the fertilizer-apartment, showing in dotted lines one of the transverse connecting-plates. Fig. 4 is a like view of the other slide, which is more especially adapted for the corn-apartment. Fig. 5 is a longitudinal sectional view of one of the slides. Figs. 6 and 7 are detail views of the slide adapted for use in the fertilizer-apartment when the latter is filled with seed of a different kind from the other apartment.

Like numerals of reference denote corresponding parts in all the figures of the drawings, referring to which—

1 designates the vertical inclosing shell or case of a hand corn-planter constructed in accordance with my present invention. This shell is preferably made of sheet metal, and at its lower extremity two of the sides 2 3 thereof are inclined or converged so as to meet or join in the vertical center or axis of the shell, whereby the lower end of the shell is given a tapering form to adapt it to readily penetrate or enter the hill when it is thrust therein to deposit the corn and fertilizer. One of these walls or sides 2 is rigid or stationary, while the other is made of spring or elastic metal to enable it to give or yield laterally of the other rigid wall, and thus open the lower end of the shell or case to permit the corn and fertilizer to escape therefrom into the hill, while at the same time the movable side or wall has sufficient resiliency to close itself and force the reciprocating slides to their normal positions when pressure is removed from the hand-lever.

At a suitable point above the tapered lower extremity of the shell or case I provide an extended bottom 4, which is rigidly secured in place in the shell by any suitable means, and above this bottom the shell is divided by a vertical longitudinal partition 5 into two compartments 6 7, one of which is designed to receive corn and the other a suitable fertilizer or phosphate. Transversely through the bottom are formed horizontal passages or ways 8 8, which intersect with vertical openings or passages 9 10, that extend through the bottom from the top to the lower side thereof. The upper ends of these vertical passages open into the compartments 6 7 of the implement, while the lower portions of said vertical passages converge to nearly a common point, so that the corn and fertilizer are deposited close together and mingled in the lower extremity of the shell 1.

In the transverse horizontal passage of the bottom is fitted two slides 11 12—one for each of the apartments 6 7 of the implement—said slides corresponding in width to the width of the apartments with which they are designed to serve, and the slides are of sufficient length to extend beyond the shell or case. The two slides are provided at each end with transverse aligned grooves or recesses 13 14, in which are fitted flat horizontal connecting-plates 16 17, which are detachably secured to the two slides by transverse pins 18, so that said slides are connected together at both ends, and are capable of movement or play simultaneously. To one of the connecting-plates 16 is pivoted the lower end of an angular vertical lever 19, that is arranged exteriorly of the case above the slides, and is fulcrumed at its upper end on the case, said lever having a horizontal arm 20, with which is connected the lower end of a link 21, the connection between said arm and link being such that the pivot can be adjusted toward or from the fulcrum of the lever. The upper extremity of the link 21 is connected to a hand-lever 22, which is fulcrumed on the case or shell near or at its extreme upper end, so that the slides can be operated without disengaging the hand from the handle-bar 23, which is fixed to the upper end of the case, and by which the implement can be forcibly thrust into the hill.

Within the lower portion of the shell or case below the fixed bottom I provide a lever 24, that is fulcrumed at an intermediate point of its length and carries a friction-roller 25 at its lower extremity, said lever being so arranged that its friction-roller is normally in contact with the movable spring side or wall 3 of the case or shell. To the opposite upper extremity of the lever 24 is pivoted a link 26, that serves to connect said lever 24 and another lever 27, the latter being arranged exteriorly of the case or shell, and is fulcrumed thereon, as shown. The upper extremity of this lever 27 is connected to the transverse plate 17 at the opposite end of the reciprocating slide, whereby, when the slides are forced laterally by operating the hand-lever to force the slots in the slides out of coincidence with the apartments 6 7, the levers 24 27 are operated to force the movable spring side 3 away from the rigid side 2, and thus open the lower end of the case or shell to permit the corn and fertilizer therein to escape by gravity from the case or shell. Each slide is further provided with a vertical longitudinal slot 30, through which seed or fertilizer can pass, and in the upper face of the slide, at one side of the slot therein, is fitted an adjustable slotted cut-off plate 31, which has a depending lip 32, that fits in the slot 30, the plate being secured in place by means of a screw 33, whereby the plate can be adjusted longitudinally of the slide to vary the area or size of the slot in the latter.

To adapt the implement for planting seed from the fertilizer-apartment, so that corn and beans can be planted in the same hill at one thrust of the implement, I have provided another slide 35, which is designed to be secured to the slide 12 in such a manner that the area or size of the slot therein is reduced, so that beans or other small seeds can be successfully planted. This slide 35 has a raised longitudinal rib 36 at one side of the longitudinal slot 37 therein, against which rib bears one edge of the slide 12, when it is properly adjusted on the slide 35, and secured thereto by a screw or other suitable fastening.

In the upper end of each vertical passage through the fixed bottom I provide an elastic detaining-strip 40, which is arranged transversely across the passage, preferably in a diagonal position, and is secured at one end directly to the bottom or to one of the sides or walls of the passage. These elastic strips serve to prevent the contents of the compartments from escaping too freely through the passages, and at the same time the necessary quantity of corn or phosphate is permitted to pass through the passage and into the slots of the slides.

The operation of my invention will be readily understood by those skilled in the art from the foregoing description taken in connection with the drawings. By raising the hand-lever the slides are moved laterally, so that the slots therein coincide with the apartments and receive the necessary amount of corn and fertilizer therefrom, and the side or wall 3 is opened; but when the hand-lever is released from pressure the movable spring side or wall 3 closes and returns the slides to their normal position, so that the contents thereof are deposited in the lower end of the case or shell. The implement is now ready for use, and the lower tapered end thereof is thrust into a hill by bearing down on the handle-bar, and the hand-lever operated to open the lower end of the shell and permit the contents thereof to enter the hill, and at the same time reciprocate the slides to deposit a new supply of corn and fertilizer in the lower end of the case, when the spring side or wall 3 is permitted to close by operating the hand-lever or by removing pressure therefrom and permitting the spring side or wall to operate the slides.

I am aware that changes in the form and proportion of parts and details of construction of the mechanisms herein shown and described as an embodiment of my invention can be made without departing from the spirit or sacrificing the advantages thereof, and I would therefore have it understood that I do not confine myself to the exact construction herein shown and described.

Having thus fully described my invention, what I claim as new, and desire to secure by Letters Patent, is—

1. In a hand corn-planter, a case or shell divided into longitudinal apartments and having a common bottom provided with independent vertical openings or passages, in combination with two slides connected together for simultaneous operation, a hand-lever connected to the slides at one end thereof, a lever arranged within the lower part of the shell or case, below the bottom thereof, and arranged to impinge against a movable spring side of said case, and connections between the opposite end of the slides and the lever, substantially as and for the purpose described.

2. In a hand corn-planter, the combination of a case divided into longitudinal apartments and having a fixed bottom which is provided with vertical passages intersected by horizontal passages, the independent slides fitted in said horizontal passages, the transverse plates detachably connected to the ends of said slides, a hand-lever connected to the slides at one end, a lever arranged within the case, below the bottom thereof, and adapted to impinge against a movable side at the extreme lower end of the case, and connections between said lever and the free end of the slide, all combined and arranged substantially as and for the purpose described.

3. In a hand corn-planter, the combination of a case or shell having the sides or walls thereof converging at its lower extremity and one of said sides of spring metal, in combination with a fixed bottom above the tapered extremity of the case, a reciprocating slide supported by said bottom, a lever carrying a friction-roller which rides against the spring side or wall of the shell, and connections intermediate of the slide and lever, substantially as and for the purpose described.

4. In a hand corn-planter, the combination, with a case or shell having a bottom provided with a transverse passage, of a slotted slide 35, provided at one side of its slot with a raised longitudinal rib, another slide fitted on the slide 35 and detachably secured thereto, and mechanism for reciprocating the slides, substantially as and for the purpose described.

In testimony whereof I affix my signature in presence of two witnesses.

CHARLES G. WATSON.

Witnesses:
  H. I. BERNHARD,
  ARTHUR L. BRYANT.